3,050,387
LIGHT-SENSITIVE MATERIAL
Wilhelm Neugebauer, Oskar Süs, and Hans-Reiner Stumpf, all of Wiesbaden-Biebrich, Germany, assignors, by mesne assignments, to Azoplate Corporation, Murray Hill, N.J.
No Drawing. Filed July 28, 1958, Ser. No. 751,112
Claims priority, application Germany Aug. 1, 1957
31 Claims. (Cl. 96—33)

This invention relates to presensitized printing plates and to a method of the production thereof and, more particularly, to presensitized printing plates containing quinone-(1,4)-diazides and interpolymeric resins in the light-sensitive layers thereof.

It is known to use presensitized printing plates in which the light-sensitive layers contain quinone-(1,4)-diazides soluble in organic solvents but poorly soluble or insoluble in water, these diazides preferably being of the benzene or naphthalene series and containing as substituents in the molecule at least one esterified or amidated sulphonic acid or carboxyl group. It is also known to incorporate in these light-sensitive coatings substances which prevent crystallization, these substances preferably being alkali-soluble resins which facilitate the formation of homogeneous layers and the presence of which has a beneficial effect if the developed printing plate must be etched after being exposed under a duplicating master.

It has been found, in accordance with the present invention, that presensitized printing plates for use in the production of printing plates by the photomechanical process, in the light-sensitive coatings of which are contained quinone-(1,4)-diazides soluble in organic solvents but poorly soluble or insoluble in water, preferably quinone-(1,4)-diazides of the benzene or naphthalene series containing as substituents in the molecule at least one esterified or amidated sulphonic acid or carboxyl group, have particular advantages if the light sensitive coating contains, in addition, interpolymeric resins derived from maleic anhydride and vinyl compounds or reaction products of phenolaldehyde resins with chloroacetic acid.

Among the interpolymeric resins of maleic anhydride and vinyl compounds which may be used are interpolymers of styrene and maleic anhydride, such as the products marketed under the registered trademark "Povimal," and under the registered trademark "Lustrex." Interpolymers of vinyl chloride/vinyl acetate and maleic anhydride, such as those products manufactured by Farbwerke Hoechst AG under the registered trademark "Hostalit" may also be employed. Preference is given to the use of such interpolymers which have been produced from equimolecular quantities of the monomeric compounds used as starting components.

Among the reaction products of phenol-aldehyde resins with chloroacetic acid which may be used, those obtained by reaction of soluble phenol-aldehyde resins, particularly of the novolak type, in alkaline reaction with chloroacetic acid have proved advantageous. These resins are carboxymethyl-ethers of the phenol-aldehyde resins in the formation of which the chloroacetic acid has reacted by etherification with the hydroxyl groups of the phenol-aldehyde condensation products. By variation of the proportions of starting resins to chloroacetic acid and suitable selection of reaction conditions, any desired degree of etherification may be obtained and the practical importance of this fact in the present invention is that the solubility of the resins in alkaline solutions is dependent upon the degree of etherification. Since carboxyl groups have entered into the molecule during etherification, the greater the number of carboxyl groups that have so entered, the less is the alkalinity necessary to dissolve or solubilize the reaction products. Thus, it is possible for the resin reaction products to be adjusted to whatever developing solutions are being used and also to the light-sensitive quinone-(1,4)-diazides present in the coating. By this means, the highest possible printing yield is assured. The optimum degree of etherification can be easily established by simple tests.

The phenol-aldehyde resins used, particularly those of the novolak type which are reacted with chloroacetic acid, require a fairly strong alkaline reaction to dissolve or solubilize them in aqueous alkaline media. For example, they are not soluble in aqueous solutions of trisodium phosphate and thus for the development of coatings which contain phenol-aldehyde resins unreacted with chloroacetic acid, in addition to the quinone-(1,4)-diazides, fairly strong alkaline developing solutions are required. However, the light-decomposition products of the p-quinone diazides are then dissolved away to some extent so that poor images are obtained or the printing yield is low. In the case of light-sensitive layers containing the reaction products of phenol-aldehyde resins with chloroacetic acid, which can be dissolved in aqueous solutions even under weakly alkaline conditions, the light-decomposition products of the p-quinone diazides are undamaged.

The light-sensitive layers produced in accordance with the present invention also exhibit very strong adhesion of the light-sensitive layer to the base material. This exceptional adhesion has a very desirable effect in the printing process since very long runs can be made with printing plates prepared in accordance with the process of the invention.

The highly polymeric materials used in the present invention and the quinone-(1,4)-diazides are applied together to the base material in solution in organic solvents and the images obtained by the exposure of this light-sensitive layer to light beneath a master are developed by treatment with dilute alkaline solutions, preferably aqueous solutions of secondary or tertiary alkali phosphates. The use of the interpolymeric resins or of the reaction products of phenol-aldehyde resins with chloroacetic acid in quantities equivalent to about 10 to 50 percent by weight of the diazo compound has proved very advantageous.

The light-sensitivity of layers containing the quinone-(1,4)-diazides is increased by the use of iminoquinone diazides in admixture with the quinone-(1,4)-diazides. The preferred iminoquinone diazides are those of the benzene or naphthalene series having the general formula

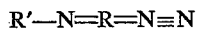

in which R is a quinone ring evolved from an aromatic ring, R' is an aromatic sulfonyl group.

The invention will be further illustrated by reference to the following specific examples:

*Example 1*

An aluminum foil brushed on both sides was whirl coated on one side thereof with a solution containing 1.5 parts by weight of benzoquinone-(1,4)-diazide-(4)-2-sulphonic acid-β-naphthylamide having the formula

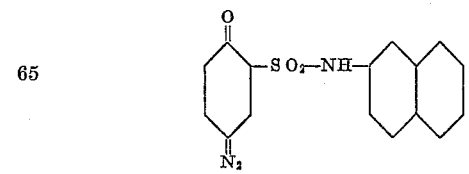

and 0.75 part by weight of an interpolymer of styrene and maleic anhydride (e.g. the product marketed under the registered trademark "Lustrex" X-820) in 100 parts by volume of glycolmonomethylether. The coated foil was dried by means of a hot air current for a short period of time and then for a further period of two minutes at a temperature of 100° C. The light-sensitive coating was then exposed to light behind a negative film master, e.g. for 1 to 2 minutes to an 18 amp. arc lamp, and the exposed coating was then developed with a 0.25-1 percent by weight trisodium phosphate solution. The developed coating was wiped over with a 1 percent by weight phosphoric acid solution and then inked up with greasy ink. From the negative film master a positive film was obtained which can be employed with the known printing machines for duplicating purposes; the number of prints obtainable with this printing plate was about twice that obtainable from a printing plate prepared without resin additive.

*Example II*

Following the general procedure of Example I above an aluminum foil was coated with a solution containing 1.5 parts by weight of the benzoquinone-(1,4)-diazide compound used in Example I and 0.15 part by weight of an interpolymer of vinyl chloride/vinyl acetate and maleic anhydride (e.g. marketed under the registered trademark "Hostalit" CAM), in 100 parts by volume of glycolmonomethylether; it was then dried and exposed to light under a negative transparent master. Development of the light exposed coating was effected using a solution consisting of 4 parts by weight of disodium phosphate and 2 parts by weight of trisodium phosphate and 100 parts by volume of water. After the developed foil was briefly rubbed down with 0.5 percent phosphoric acid solution, it was inked up with greasy ink and a positive printing plate was obtained from the negative master.

*Example III*

A brushed aluminum foil was whirl coated with a solution containing 1.5 parts by weight of benzoquinone-(1,4)-diazide-(4)-6-bromo-2-sulphonic acid anilide having the formula

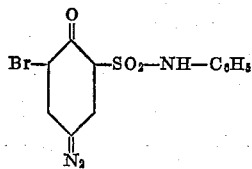

and 0.75 part by weight of an interpolymer of styrene and maleic anhydride (e.g. the product marketed under the registered trademark "Lustrex" X-820), in 100 parts by volume of glycolmonomethylether. After being dried, the light-sensitive side of the foil was exposed to light behind a negative film master and developed with a 0.5 percent trisodium phosphate solution. The developed foil was wiped over with a 0.5 percent phosphoric acid solution and inked up with greasy ink, which produced a positive printing plate from which very long runs can be obtained.

*Example IV*

Following the general procedure of Example I above, an aluminum foil was coated with a solution containing 1.5 parts by weight of benzoquinone-(1,4)-diazide-(4)-2-sulphonic acid-α-naphthylamide having the formula

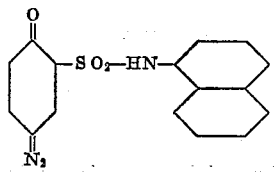

and 0.15 part by weight of an interpolymer of vinyl chloride/vinyl acetate and maleic anhydride (e.g. marketed under the registered trademark "Hostalit" CAM), in 100 parts by volume of glycolmonomethylether, which was then dried and exposed to light under a master. The development of the exposed foil was effected using a 0.5-1 percent trisodium phosphate solution after which the developed foil was wiped over with a 0.5 percent phosphoric acid solution and inked up with greasy ink. A positive printing foil is obtained from a negative master.

*Example V*

A brushed aluminum foil was coated with a solution, in 100 parts by volume of glycolmonomethylether, of 1.5 parts by weight of benzoquinone-(1,4)-diazide-2-sulphonic acid-β-naphthylamide having the formula

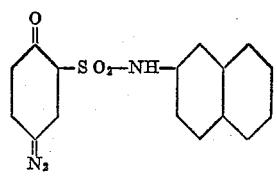

and 0.5 part by weight of one of the reaction products A, B, C or D of phenol-aldehyde resin with chloroacetic acid described hereinafter. The foil was dried and exposed to light under a negative master and, after exposure, it was developed with a solution of 18.5 grams of crystallized trisodium phosphate,
40.0 grams of crystallized disodium phosphate, and
0.5 gram of alkylnaphthalene sulphonic acid sodium salt,
  in one liter of water.

The developed foil was then rinsed with water and wiped over with a 0.5 percent solution of phosphoric acid after which it was inked up with greasy ink and used as a printing plate. Considerably longer runs are obtained than with a coating prepared without the addition of the reaction product of the phenol resin and chloroacetic acid.

If a novolak which is not reacted with the sodium salt of chloroacetic acid is used instead of one of the reaction products A, B, C or D described below, the printing plates, after the exposure thereof to light under a master, cannot be developed with the developer described above. More strongly alkaline solutions are required for the developer and the printing image is damaged by the action of the alkali so that the quality of the prints and also the length of runs obtainable is deleteriously affected.

The reaction products A, B, C and D of the phenol-aldehyde resin with chloroacetic acid are prepared as follows:

*Resin A.*—100 grams of finely pulverized novolak (e.g. the product marketed under the registered trademark "Alnovol" 429k), are introduced slowly at a temperature of 50° C. into a solution of 36 grams of commercial caustic soda in 500 ml. of water. After the novolak has dissolved, the solution is heated to boiling; 125 grams of the powdered sodium salt of chloroacetic acid are added over a period of about 20 minutes and boiling is continued for an additional period of an hour and a half. Any clouding which may occur is dissolved away by the addition of as small a quantity as possible of caustic soda. The reaction mixture is then diluted with twice its volume of water at a temperature of 40° C. and sufficient hydrochloric acid (1:2) is added to give a slight acid reaction to congo paper. The precipitated resin is filtered, thoroughly extracted with water, and dried at a temperature of 110° C. About 100 grams of resin are obtained having 10–11 percent of carboxyl groups, corresponding to 30–34 percent etherification.

*Resin B.*—115 grams of 2-methylphenol, 110 grams of formalin (30 percent), 150 ml. of 25 percent sodium chloride solution, 2.5 grams of gum arabic, 50 ml. of 2 N sodium hydroxide solution and 25 ml. of 2 N ammonium hydroxide solution are heated to boiling in a reflux flask for a period of one and a half hours. The reaction mixture is then diluted with water and the precipitated resin, which is in solid form, is pulverized, washed well with water, and dried at a temperature of 130° C. The yield is 129 grams of 2-methylphenol-formaldehyde resin.

100 grams of 2-methylphenol-formaldehyde resin are introduced with stirring into a solution of 36 grams of caustic soda in 500 ml. of water at a temperature of 50° C. The mixture is heated to a temperature of 100° C. and, over a period of 15 minutes, 125 grams of the sodium salt of chloroacetic acid are introduced, the first portion of which goes into solution; later, a viscous resin is precipitated. 100 ml. of 2 N caustic soda are then added to the reaction mixture and the resin goes partially into solution. The mixture is again heated to a temperature of 100° C., while stirring, for a period of 2 hours and, after being cooled to a temperature of 60° C., the reaction mixture is acidified with hydrochloric acid (1:2), the resin precipitate is separated from the mother liquor by suction, washed well with water and dried at a temperature of 100° C. The yield is 115 grams of a brown resin having a carboxyl group content of 13 grams —COOH per 100 grams of resin.

*Resin C.*—54 grams of 2-methylphenol, 60 grams of furfural, 12 grams of caustic soda and 5 ml. of water, are heated under reflux for a period of two and a half hours. The water is then evaporated under a pressure of 100 mm. with an external temperature in the range of 150–160° C. The reaction product is decanted several times and, after drying, 62 grams of 2-methylphenol-furfural resin are obtained.

39 grams of this resin are heated with 9 grams of caustic soda in 125 ml. of water to a temperature of 60° C. To this mixture, 32 grams of the sodium salt of chloroacetic acid are added at a temperature of 100° C., while stirring, and the mixture is then heated to boiling for a period of one and a half hours after which it is cooled to a temperature of 60° C. and acidified with hydrochloric acid (1:2). The precipitated resin is decanted several times with hot water and dried at a temperature of 130° C. The yield is 40 grams of etherified resin product.

*Resin D.*—134.2 grams of 2,5-dimethylphenol, 110 ml. of formalin (40 percent), 150 ml. of 25 percent sodium chloride solution, 2.5 grams of gum arabic, 50 ml. of 2 N sodium hydroxide solution and 25 ml. of 2 N ammonium hydroxide solution are heated under reflux for a period of one and a half hours. The reaction product is poured into 2 liters of water, the precipitated solid resin is pulverized, washed well with water and dried at a temperature of 130° C. The yield is 144.5 grams of 2,5-dimethylphenol-formaldehyde resin.

113 grams of this resin are dissolved in a solution of 36 grams of caustic soda in 500 ml. of water at a temperature of 60° C. To this solution 125 grams of the sodium salt of chloroacetic acid are added at a temperature of 110° C. during a period of 15 minutes. A resin precipitates to which are added 80 ml. of 50 percent sodium hydroxide solution and 1000 ml. of water and the mixture is again heated for half an hour at a temperature of 100° C. after which it is cooled to a temperature of 60° C. and acidified with hydrochloric acid (1:2). The precipitated solid resin is separated by suction from the mother liquor, washed well with water and dried at a temperature of 130° C. The yield is 114 grams of a yellow resin having a carboxyl group content of 5.5 grams of —COOH per 100 grams of resin.

*Example VI*

A solution containing 0.75 part by weight of benzoquinone-(1,4)-diazide-(4)-2-sulphonic acid - β - naphthylamide (see Example I), 0.75 part by weight of N-(4'-methylbenzene-sulphonyl)-imino-2,5-diethoxy - benzoquinone-(1,4)-diazide-4 having the formula

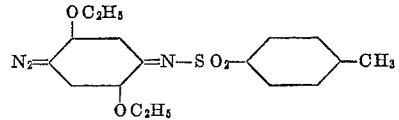

and 0.5 part by weight of resin A (see Example V) and 100 parts by volume of glycolmonomethylether were coated upon a brushed aluminum foil. The coated foil was dried and then exposed to light behind a negative film master. For the development of the image on the light exposed foil, a solution was used containing 2 parts by weight of trisodium phosphate and 4 parts by weight of disodium phosphate in 100 parts by volume of water. After development, the foil was rinsed with water, wiped over on the image side with a 1 percent phosphoric acid solution and then inked up with greasy ink. From a negative master, a positive printing plate was obtained.

*Example VII*

0.75 part by weight of N-(4'-methylbenzene-sulphonyl) imino - 2,5 - diethoxy-benzoquinone-(1,4)-diazide-4 (see Example VI), 0.75 part by weight of benzoquinone-(1,4)-diazide-(4)-2-sulphonic acid - β - ethoxy-α-naphthylamide having the formula

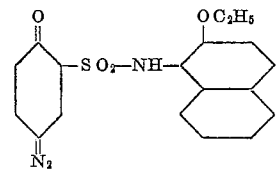

and 0.75 part by weight of an interpolymer of styrene and maleic anhydride (e.g. the product marketed under the trademark "Lustrex" X–820), were dissolved in 100 parts by volume of glycolmonomethylether and a roughened aluminum foil was coated with this solution. After the foil was exposed to light under a master, the exposed coating was developed with a solution containing 2 parts by weight of trisodium phosphate and 4 parts by weight of disodium phosphate in 100 parts by volume of water. The developed foil was briefly rinsed with water and wiped over on the image side with a 1 percent phosphoric acid solution. When the foil is inked up with greasy ink, a positive printing plate is obtained.

*Example VIII*

A solution containing 0.75 part by weight of benzoquinone-(1,4)-diazide-(4)-2-sulphonic acid-β-naphthylamide (see Example I), 0.75 part by weight of N-(benzenesulphonyl) - imino-2,5-diethoxybenzoquinone-(1,4)-diazide-4 having the formula

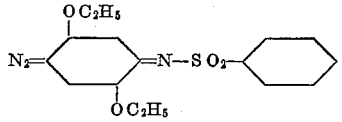

and 0.5 part by weight of resin B (see Example V) in 100 parts by volume of glycolmonomethylether was applied to a brushed aluminum foil and dried, after which the foil was exposed to light under a negative master. Development of the exposed coating was effected using a solution of 2 parts by weight of trisodium phosphate and 4 parts by weight of disodium phosphate in 100 parts by volume of water. The developed foil was wiped over briefly with a 1 percent phosphoric acid solution and then was inked up with greasy ink which produced a positive printing plate.

Example IX

A brushed aluminum foil was coated with a solution containing 0.75 part by weight of the sulphonic acid amide formed from benzoquinone-(1,4)-diazide-(4)-2-sulphonic acid and 2-aminodiphenylether and having the formula

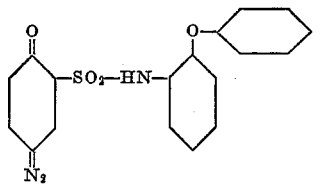

and 0.75 part by weight of N-(4'-ethylbenzene-sulphonyl)-imino-2,5-diethoxy benzoquinone-(1,4)-diazide-4 having the formula

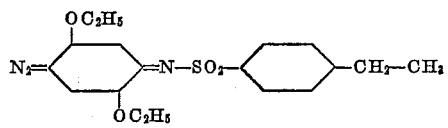

and 0.5 part by weight of resin A (see Example V), in 100 parts by volume of glycolmonomethylether. After being dried, the light-sensitive foil was exposed under a negative master and developed with a solution containing 2 parts by weight of trisodium phosphate and 4 parts by weight of disodium phosphate in 100 parts by volume of water. The developed foil was briefly treated with a 1 percent phosphoric acid solution and, after being inked up with greasy ink, is ready for use as a positive printing plate.

It will be obvious to those skilled in the art that many modifications may be made within the scope of the present invention without departing from the spirit thereof, and the invention includes all such modifications.

What is claimed is:

1. A presensitized printing plate of high yield comprising a base material having a layer thereon comprising a quinone-(1,4)-diazide and a resinous product selected from the group consisting of interpolymeric resins of maleic anhydride and vinyl compounds and ethers of a phenol-aldehyde resin with chloroacetic acid.

2. A presensitized printing plate according to claim 1 in which the layer also contains a light-sensitive iminoquinone diazide.

3. A presensitized printing plate according to claim 2 in which the iminoquinone diazide has the formula:

in which R is a quinoid ring derived from an aromatic ring, R' is an aromatic sulfonyl group.

4. A presensitized printing plate according to claim 1 in which the quinone-(1,4)-diazide has the formula:

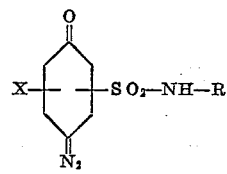

in which X is selected from the group consisting of hydrogen and halogen, and R is an aryl group.

5. A presensitized printing plate according to claim 1 in which the quinone-(1,4)-diazide has the formula:

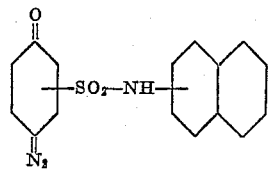

6. A presensitized printing plate according to claim 1 in which the quinone-(1,4)-diazide has the formula:

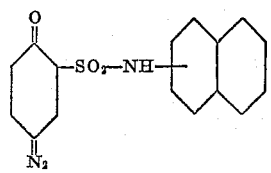

7. A presensitized printing plate according to claim 1 in which the quinone-(1,4)-diazide has the formula:

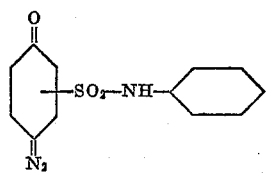

8. A presensitized printing plate according to claim 1 in which the quinone-(1,4)-diazide has the formula:

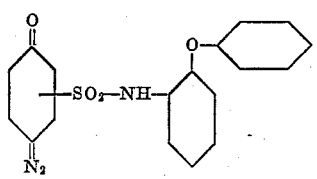

9. A presensitized printing plate according to claim 3 in which the iminoquinone diazide has the formula:

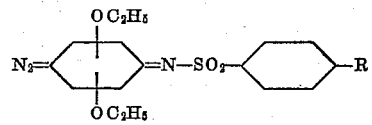

in which R is selected from the group consisting of hydrogen and alkyl radicals.

10. A presensitized printing plate according to claim 3 in which the iminoquinone diazide has the formula:

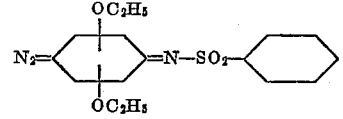

11. A presensitized printing plate according to claim 3 in which the iminoquinone diazide has the formula:

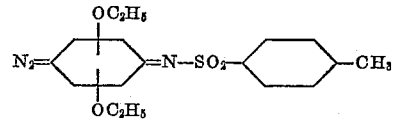

12. A presensitized printing plate according to claim 3 in which the iminoquinone diazide has the formula:

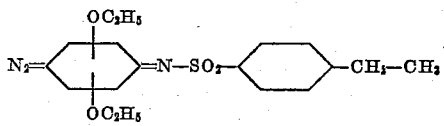

13. A method of developing a presensitized printing plate of high yield which comprises exposing to light under a master, a base material having a layer thereon comprising a quinone-(1,4)-diazide and a resinous product selected from the group consisting of interpolymeric resins derived from maleic anhydride and vinyl compounds and ethers of a phenol-aldehyde resin with chloroacetic acid, and treating the light-exposed layer with a developer.

14. A method according to claim 13 in which the layer also contains a light-sensitive iminoquinone diazide.

15. A method according to claim 14 in which the iminoquinone diazide has the formula:

in which R is a quinoid ring derived from an aromatic ring, R' is an aromatic sulfonyl group.

16. A method according to claim 13 in which the quinone-(1,4)-diazide has the formula:

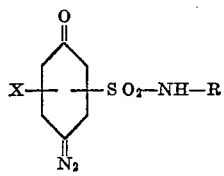

in which X is selected from the group consisting of hydrogen and halogen, and R is an aryl group.

17. A method according to claim 13 in which the quinone-(1,4)-diazide has the formula:

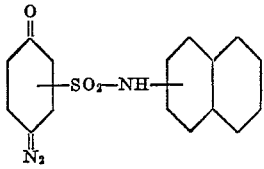

18. A method according to claim 13 in which the quinone-(1,4)-diazide has the formula:

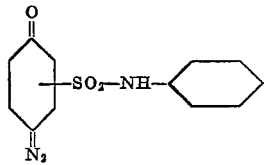

19. A method according to claim 13 in which the quinone-(1,4)-diazide has the formula:

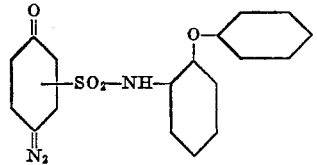

20. A method according to claim 15 in which the iminoquinone diazide has the formula:

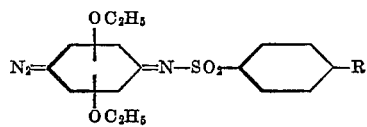

in which R is selected from the group consisting of hydrogen and alkyl radicals.

21. A method according to claim 15 in which the iminoquinone diazide has the formula:

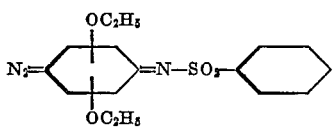

22. A method according to claim 15 in which the iminoquinone diazide has the formula:

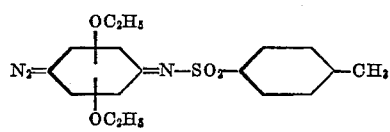

23. A method according to claim 15 in which the iminoquinone diazide has the formula:

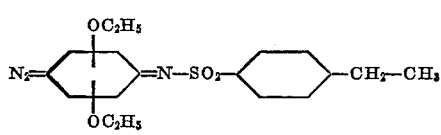

24. A presensitized printing plate according to claim 1 in which the quinone-(1,4)-diazide has the formula:

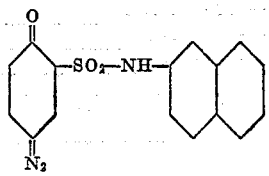

25. A presensitized printing plate according to claim 1 in which the quinone-(1,4)-diazide has the formula:

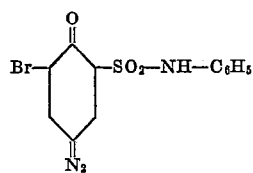

26. A presensitized printing plate according to claim 1 in which the quinone-(1,4)-diazide has the formula:

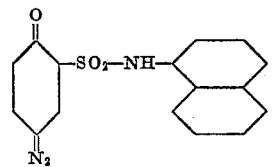

27. A presensitized printing plate according to claim 1 in which the quinone-(1,4)-diazide has the formula:

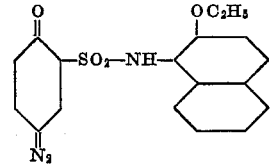

28. A presensitized printing plate according to claim 1 in which the quinone-(1,4)-diazide has the formula:

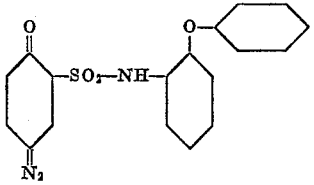

29. A presensitized printing plate according to claim 2 in which the iminoquinone diazide has the formula

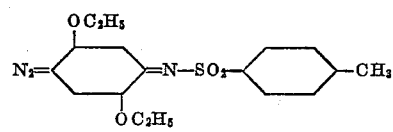

30. A presensitized printing plate according to claim 2 in which the iminoquinone diazide has the formula

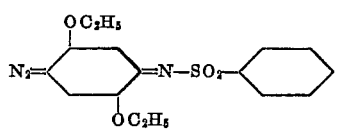

31. A presensitized printing plate according to claim 2 in which the iminoquinone diazide has the formula

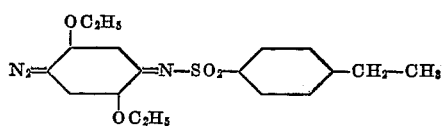

(References on following page)

References Cited in the file of this patent

UNITED STATES PATENTS

| | | |
|---|---|---|
| 1,981,102 | Hagedorn et al. | Nov. 20, 1934 |
| 2,754,209 | Schmidt et al. | July 10, 1956 |
| 2,759,817 | Schmidt et al. | Aug. 21, 1956 |

FOREIGN PATENTS

| | | |
|---|---|---|
| 1,003,576 | Germany | Feb. 28, 1957 |
| 788,975 | Great Britain | Jan. 8, 1958 |

OTHER REFERENCES

Schildknecht: Vinyl and Related Polymers, John Wiley & Sons, Inc., N.Y., Chapman & Hall, Ltd., London, 1952, pages 50–51.